J. F. & E. C. SCHUTT.
FISH DAM.
APPLICATION FILED AUG. 8, 1913.

1,098,645.

Patented June 2, 1914.
2 SHEETS—SHEET 1.

Inventors
J. F. Schutt and E. C. Schutt.

Witnesses
C. W. P. Newbold
H. Kaye Martin

By Randolph Jr.
Attorney

J. F. & E. C. SCHUTT.
FISH DAM.
APPLICATION FILED AUG. 8, 1913.

1,098,645.

Patented June 2, 1914.

2 SHEETS—SHEET 2.

Inventors
J. F. Schutt and E. C. Schutt

UNITED STATES PATENT OFFICE.

JOHN F. SCHUTT AND EMIL C. SCHUTT, OF BROCKPORT, NEW YORK.

FISH-DAM.

1,098,645.

Specification of Letters Patent.

Patented June 2, 1914.

Application filed August 8, 1913. Serial No. 783,733.

*To all whom it may concern:*

Be it known that we, JOHN F. SCHUTT and EMIL C. SCHUTT, citizens of the United States, residing at Brockport, in the county of Monroe and State of New York, have invented certain new and useful Improvements in Fish-Dams; and we do hereby declare the following to be a full, clear, and exact description of the invention, such as will enable others skilled in the art to which it appertains to make and use the same.

This invention relates to new and useful improvements in fish dams and has for its object the provision of a device of the above character which will prevent small trout or other fish from entering the stream.

Another object of our invention is the provision of such a device which will permit logs, timber and the like to pass over the dam.

A still further object of our invention is the provision of such a device which will materially assist such timbers in passing down the stream.

Figure 1:
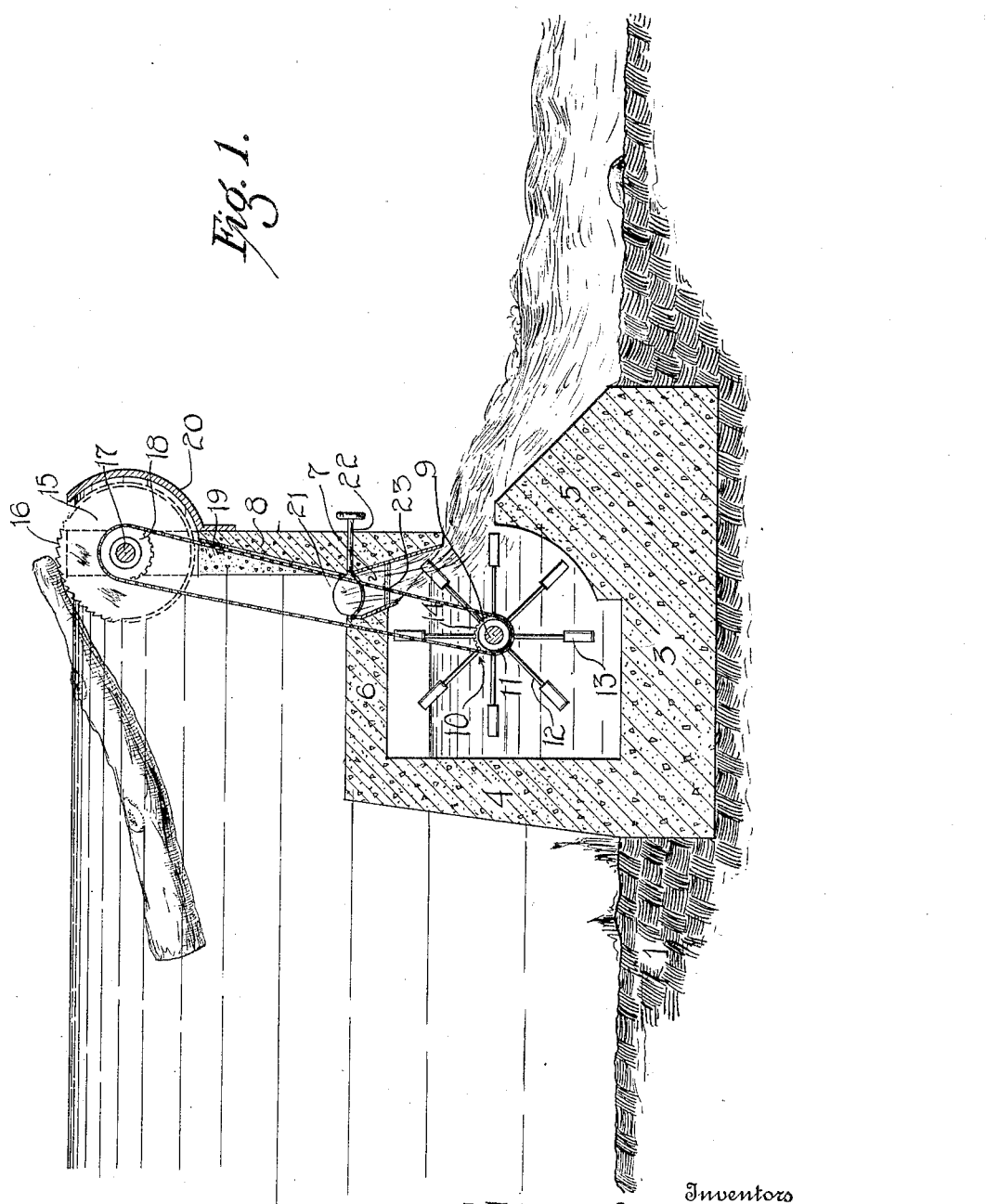
Figure 2:
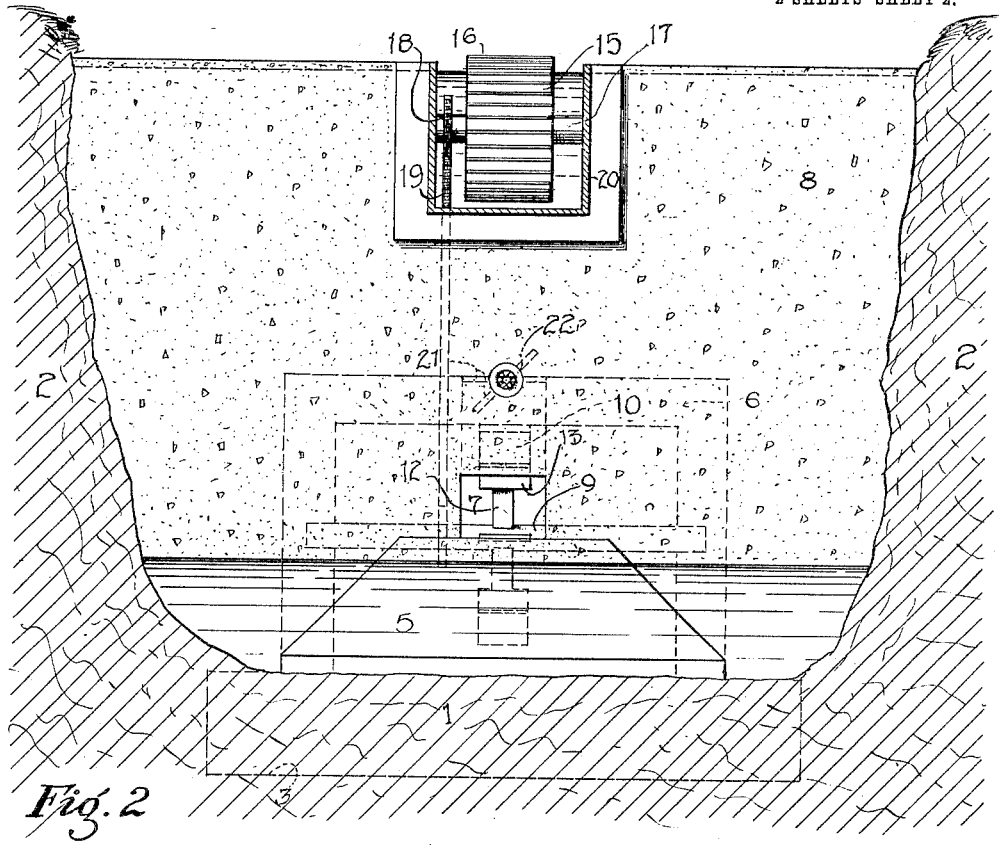
Figure 3:
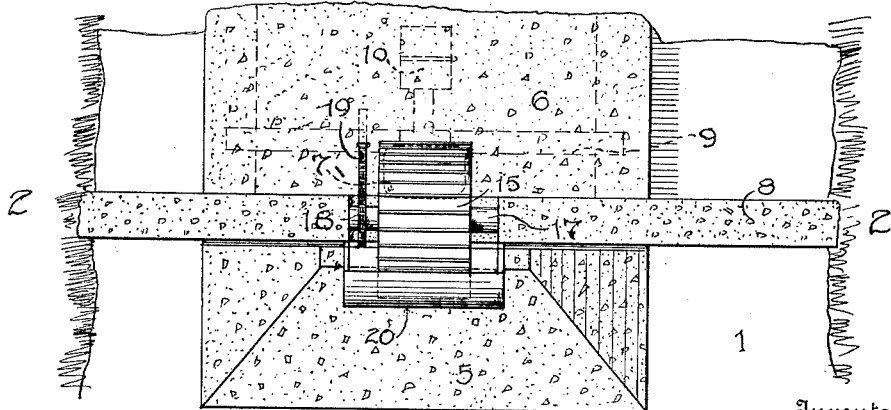

With the above and other objects in view we now proceed to describe our invention in the following specification and accompanying drawings, in which, Figure 1 is a side view of our improved fish dam, showing the abutments in section and the interior mechanism of the device, Fig. 2 is a front view of our improved fish dam showing the same in place, and Fig. 3 is a top plan view of a portion of our improved fish dam.

Referring to the drawings by characters of reference 1 indicates the bottom of the creek which is formed between the walls 2. A suitable foundation 3 is laid in a pit forming the bottom of the creek and is preferably of concrete or any other suitable material. This foundation 3 has extending upwardly therefrom and at right angles thereto the wall 4 which is formed integrally with the foundation along the edge which is presented up stream. Along the opposite edge of the foundation is formed the wall 5, the use of which will be more fully hereinafter described. An angularly extending portion 6 is formed integrally with the wall 4 at its upper extremity and is provided with an aperture 7 through which the water is adapted to flow when the device is in use. Extending upwardly from the wall 5 and cast integrally therewith is preferably formed a suitable wall 8 which is provided in the upper edge with a suitable recess in which the carrier wheel is adapted to be journaled.

Journaled in the end walls of the chamber formed by the walls 4 and 5 is a suitable shaft 9 intermediate the ends of which is secured a water wheel 10. This water wheel preferably comprises the hub 11 and the spokes 12 which carry at their outer extremities the paddles 13 which are adapted to coöperate with the water and cause the wheel to turn. A suitable sprocket wheel 14 is secured to the hub of the water wheel, the use of which will be more fully hereinafter described.

A suitable carrier wheel 15 having the ribs 16 formed on the periphery thereof is carried on the shaft 17 which is journaled in the bearing formed in the sides of the recess in which the carrier wheel is mounted. A suitable sprocket wheel 18 is secured to the hub of the carrier wheel and is adapted to be operated by means of the chain 19 which extends downwardly and over the sprocket wheel 14 which was described in the foregoing. A suitable guard 20 is secured to the wall 8 by any suitable means and is adapted to prevent the water which is held back by said wall from flowing out through the recess formed in the upper edge thereof.

A suitable liquid controlling means preferably comprising a disk 21 is rotatably mounted on the axle 22 which extends transversely through the wall. This liquid controlling means is adapted to be so formed that the flow of the water through the aperture 7 may be regulated. Intermediate the ends of the aperture 7 and suitably secured therein is preferably provided a screen 23 which is adapted to prevent small fish from entering the aperture and passing upwardly against the flow of the water.

It will be apparent from the foregoing that in operation the water passing downwardly through the aperture 7 will cause the wheel 10 to revolve, which through the means of the sprocket wheel 14 and the chain 19 will revolve the carrier wheel and any logs, timber or the like will be carried over the dam and deposited on the other side and fish and the like will be prevented from entering the stream above the dam.

While in the foregoing we have shown and described the preferred form of our invention we wish it to be understood that we may change the specific arrangement and combination of parts without in any way departing from the spirit and scope of our invention as defined in the appended claims.

What is claimed is:—

1. In a device of the character described a dam, an outlet opening near the bottom of said dam, and adapted to permit water to flow outwardly, a ribbed wheel mounted at the upper edge of said dam, to cause floating objects to fall over said dam, and means mounted in the outlet opening, operated by the flow of water therethrough, and connected to the wheel to cause the same to revolve.

2. In a device of the character described a dam having an outlet opening near its lower edge, the upper edge of said dam having a recess therein, a paddle wheel journaled in the dam in alinement with the opening and adapted to be operated by the passage of water through said opening, a carrier wheel journaled in the recess in the upper edge of the wall, and flexible means connected with two wheels to cause the carrier wheel to revolve as the water passes through the opening in the dam.

3. In a device of the character described a dam having an outlet opening near its lower edge and a recess in its upper edge, wheels journaled in both the outlet opening and the recess, the wheel in the outlet opening being adapted to be revolved by the liquid as it passes therethrough, a flexible member operatively connected to the wheels, and means to control the flow of liquid through the outlet opening.

In testimony whereof we affix our signatures in the presence of two witnesses.

JOHN F. SCHUTT.
EMIL C. SCHUTT.

Witnesses:
NORTON KANOUS,
JOHN McGRATH.

---

Copies of this patent may be obtained for five cents each, by addressing the "Commissioner of Patents, Washington, D. C."